United States Patent [19]

Rudwick

[11] 4,186,935
[45] Feb. 5, 1980

[54] THREE-WHEELED VEHICLE

[76] Inventor: Lawrence A. Rudwick, 2718 N. Randolph, Arlington, Va. 22207

[21] Appl. No.: 833,988

[22] Filed: Sep. 16, 1977

Related U.S. Application Data

[63] Continuation-in-part of Ser. No. 600,953, Aug. 1, 1975, abandoned.

[51] Int. Cl.² .............................................. B62K 9/02
[52] U.S. Cl. .................................... 280/269; 267/57; 267/154; 280/721
[58] Field of Search ............... 280/263, 261, 274, 275, 280/282, 87.02 R, 721, 267, 269; 267/57, 154

[56]  References Cited

U.S. PATENT DOCUMENTS

| | | | |
|---|---|---|---|
| 1,622,198 | 3/1927 | Keeler | 280/267 |
| 2,311,424 | 2/1943 | Weller, Jr. | 280/269 |
| 3,429,584 | 2/1969 | Hendricks | 280/269 |
| 3,913,929 | 10/1975 | Matsuura | 280/269 |

*Primary Examiner*—Joseph F. Peters, Jr.
*Assistant Examiner*—Michael Mar
*Attorney, Agent, or Firm*—Rose & Edell

[57]  ABSTRACT

A three-wheeled vehicle is disclosed having an improved simplified, light weight, tubular frame design which provides a U-shaped anti-sway bar for resistance to twisting of the frame and allows a steering system having a pair of front wheels to be steered by a handlebar that is mounted on a vehicle frame member beneath the seat of the vehicle operator, the handlebar curving upward and wider than the seat for convenient operation and access to the vehicle seat. The frame for the seat of the operator is provided by the anti-sway bar. The front wheels mount to the frame behind operator's feet, under normal riding conditions; steering being such that sharp turns may be made without interference between the wheels on the one hand and the frame and steering members on the other.

10 Claims, 5 Drawing Figures

THREE-WHEELED VEHICLE

CROSS REFERENCE TO PENDING APPLICATIONS

This application is a continuation-in-part of my co-pending application Ser. No. 600,953 filed Aug. 1, 1975, for Three-Wheeled Vehicle, now abandoned.

BRIEF DESCRIPTION OF PRIOR ART

Three-wheeled vehicles are well known in the prior art, as evidenced, for example, by U.S. Pat. Nos. of Hendricks 3,429,584, La Brie 3,561,778, Ryan 3,311,388, and Matsuura 3,913,929. In these patents, however, there are interferences between members, such as steering levers, frame members and wheels, and a variety of frame members which interfere with easy exit and entry of the vehicle, steering components which severely limit the ability to make sharp turns and other obstacles which post a hazard in the event of an accident. The vehicle of the present invention is capable of speeds in excess of those of ten-speed bicycles under many equal conditions due to the lowered wind resistance. Thus, a vehicle of this nature must also be designed to withstand large torsional forces which, when turning, can cause the frame to tend to twist and the rear wheel tilt in the opposite direction of the turn, allowing a dangerous oversteering effect to occur. This force is due to the centrifugal force on the rider against an opposite side force on the rear wheel where it contacts the road. Frame designs known to the inventor have not thus far been such as to allow necessary travel of a handlebar, pivotally mounted underneath the seat as in the present invention, be light in weight or safe at the speeds contemplated and still provide torsional strength adequate to resist the forces discussed above. Also, braking systems have been quite inadequate for vehicles of this type; stops must be short and straight.

SUMMARY OF THE INVENTION

In order to avoid the above and other drawbacks of known three-wheeled vehicles, the vehicle of the present invention was developed including an improved frame design compatible with an improved steering mechanism arranged at an unobstructing location on the vehicle frame beneath the seat and extending to the sides of the operator, thereby permitting easy mounting and dismounting, and lessening the likelihood of injury in the event of an accident. The frame design comprises two basic members; a cross member which supports at its outer ends the wheels of the vehicle, and an anti-sway bar which is a generally horizontal U-shaped member of hollow tubing with the ends of the legs of the "U" curved downward to about a 90° angle to the horizontal and into contact with the cross member. The rear or third wheel of the vehicle is carried in a forked member sloping rearwardly and perhaps, depending upon the diameter of the wheel, downward from the center of the base of the U-shaped member.

Canvas or other suitable material is secured between the legs of the horizontal section of the U-shaped member to provide a seat. The steering mechanism comprises a wide-base U-shaped member having a central pivot transversely centrally located under the seat and extending upwardly on either side of the seat to provide hand grips at a convenient location. The base of the U-shaped steering member carries a pitman for controlling the wheels. Motive power, if any, may be by foot or by an engine or motor.

The frame construction set forth above, specifically the use of the U-shaped member, provides an anti-sway bar for preventing twisting of the cross member and the yoke that carry the wheels; an essential feature when it is considered that the vehicle of the invention exceeds the maximum speeds of 10 speed bikes in many instances.

The steering mechanism with its centrally located pitman and single connection to each wheel for steering permits a large turning angle of the wheels permitting sharp turns; such being aided by the low twist feature of the frame.

Accordingly, the primary object of the present invention is to provide a 3-wheeled vehicle which is highly maneuverable, has a small turning radius, is highly stable and yet not overly wide so it may be used on public streets and sidewalks. Said vehicle provides a pair of steerable front wheels and a rear wheel rotatably connected with the rigid frame, characterized by the provision of steering means including a handlebar which pivots beneath the seat of the vehicle operator, said handlebar extending upwardly on opposite sides of the seat for convenient gripping by the operator's hands out of harm's way in case of accident, as well as, providing no obstruction during mounting of and dismounting from the vehicle.

A more specific objective of the invention is to provide a vehicle whose frame is light in weight, requires a small number of frame components yet has adequate resistance to sway that could cause the rear portion of the frame to twist, and the rear wheel to tilt while turning.

Still another object of the present invention is to provide a vehicle with a seat on which one can sit without lifting a foot off the ground, said seat comprising a member that is an integral part of the vehicle frame.

Yet another object of the present invention is to provide an improved steering system which allows the operator to steer easily with either hand independently or both hands simultaneously, in a comfortable, natural, symmetric position, by a handlebar mounted in close proximity of the operator's hands and the front steering wheels, whose rotation is similar to that of bicycles for improved leverage and familiarity.

It is another object of the present invention to provide a steering system which allows the handlebar be used as an aid for mounting and dismounting the vehicle, such being particularly useful for the handicapped and the elderly.

It is yet another object of the present invention to provide a handlebar as above which allows the handlebar to be pulled rearward with great force using both hands simultaneously, as an aid in a muscle-powered embodiment of the vehicle.

Still another object of the present invention is to provide a steering system whose critical components can be extremely lightweight yet very abuse-resistant, not being affected by forces on the handlebar other than normal rotation.

Yet another object is to provide a steering system not needing a tie rod that runs the distance between the front wheels, yet allows the inside front wheel to pivot at a greater angle than the outside front wheel, to minimize scuffing of the tires, such being accomplished by the angles between the steering arms and the pitman and/or the wheel pivots.

It is an object to provide a frame design which allows automotive size batteries and an electric motor to be mounted underneath the seat of a vehicle and between its wheels, for a low center of gravity electric vehicle.

Still another object is to provide improvements in a braking system in a vehicle of such wheel configuration, by synchronization of the front brakes through an improved cabling mechanism in conjunction with the vehicle's steering components.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein.

DESCRIPTION OF THE PREFERRED EMBODIMENTS

Figure 1:
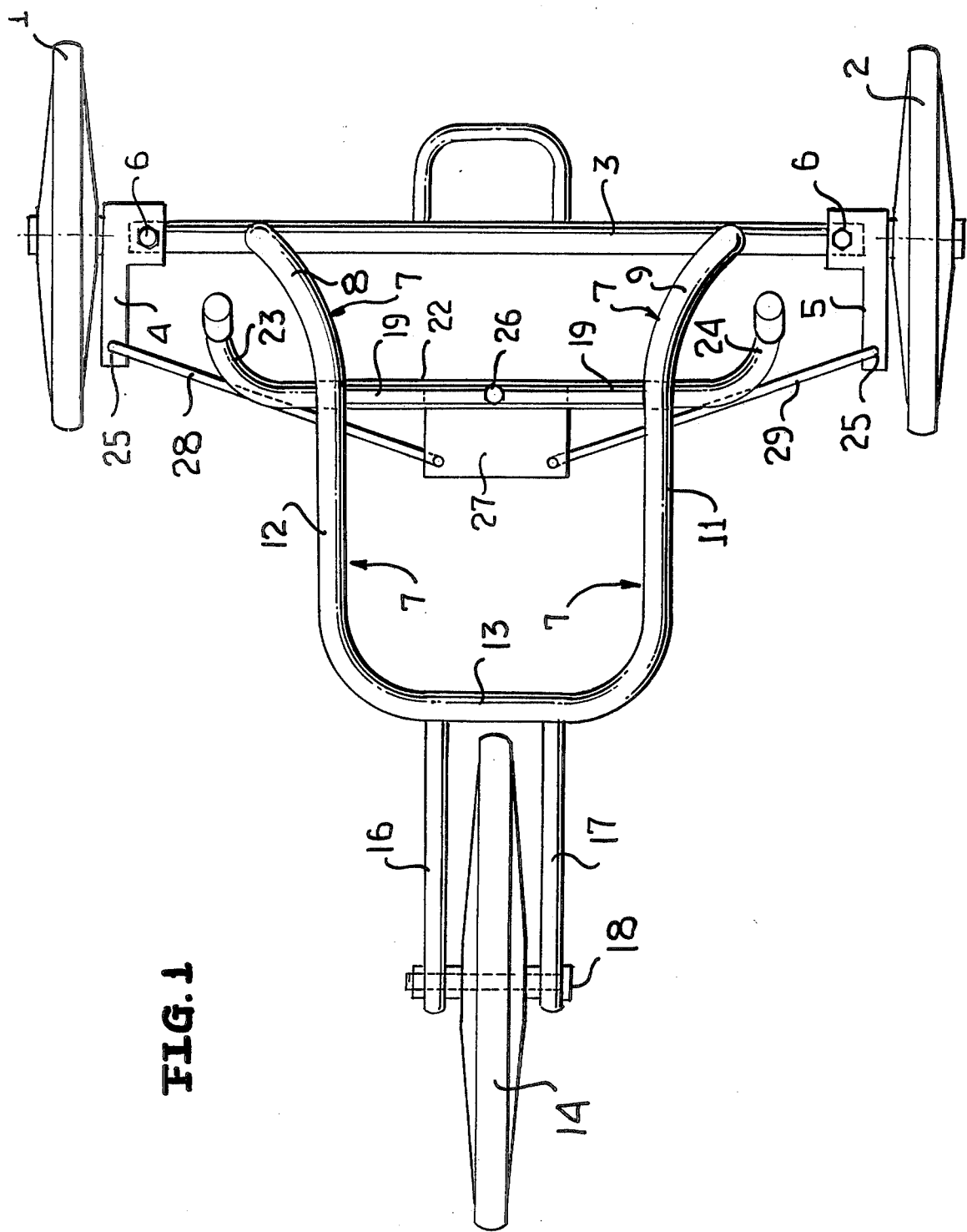
FIG. 1 is a top plan view of the basic apparatus.
Figure 2:
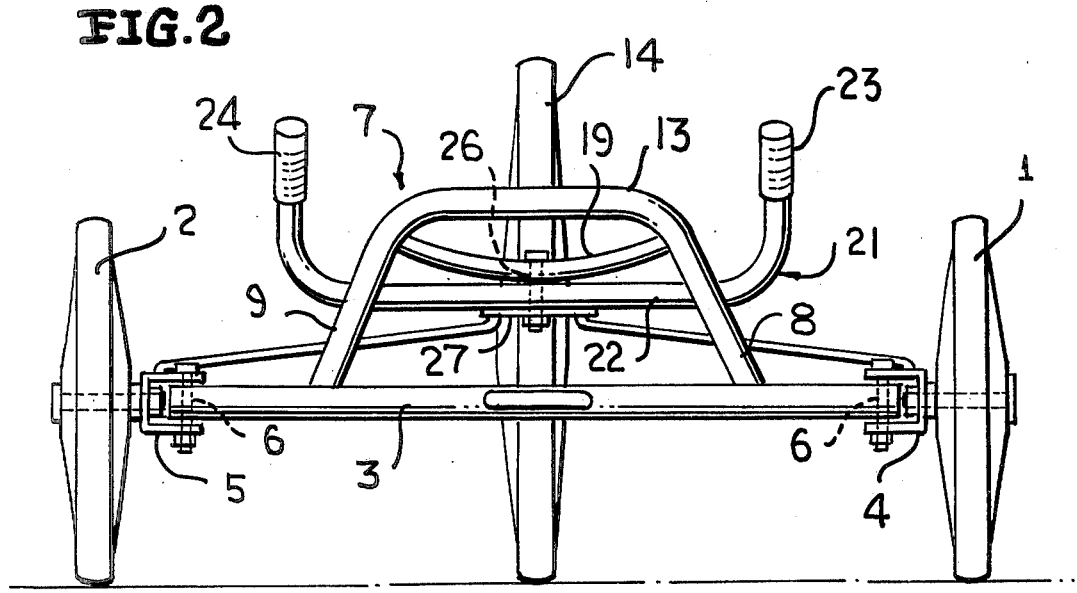
FIG. 2 is a front plan view of the basic apparatus.
Figure 3:
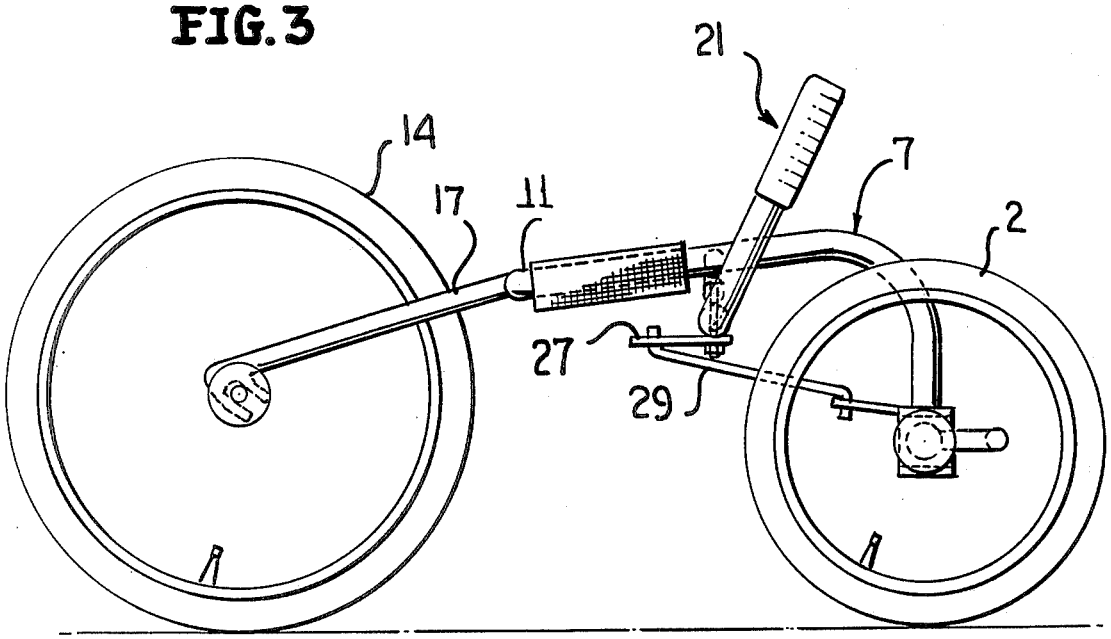
FIG. 3 is a side plan view of the basic apparatus.

Referring first more particularly to FIGS. 1-3, the 3-wheeled vehicle of the present invention includes a rigid frame formed of tubes or bars of a suitable material (such as steel), a pair of steerable forward wheels 1 and 2 rotatably connected with a transverse tubular frame member 3 by means of knuckle arms 4 and 5 and kingpins 6. Rigidly attached to said transverse frame member 3 near said kingpins is a U-shaped frame member 7 whose forward ends 8 and 9 are curved downward and into contact with frame member 3. From the transverse tube, the ends 8 and 9 of said curved frame member 7 first project generally vertically then curve to the horizontal and rearwardly, generally parallel to provide sides 11 and 12 and continue on to form the base of the "U", reference numeral 13. A canvass (or other material) seat is attached (by lacing or other means) between members 11 and 12.

The purposes of the tubular frame member 7 are important, including (a) providing a mounting frame for a lightweight yet broad and comfortable sling seat, (b) providing an anti-sway bar all of member 7 to control torsional and twisting forces without the need for reinforcing struts, (c) transmitting the rider's weight to points near the front wheels 1 and 2 (where the member 7 attaches to the transverse member 3) which weight might otherwise cause the transverse member 3 to bend when encountering large road shocks (thereby increasing the weight capacity of the frame) and (d) providing a convenient stop for the handlebar to be described, which approaches or contacts member 7 during an extremely sharp turn, thus eliminating the possibility of turning too sharply and damaging steering components and/or fouling one's leg on the handlebar.

Means are provided rearward of the seat tube for the mounting of a rear wheel 14. Specifically, two tubes or bars 16 and 17 (or a bent tube or bar or yoke) extend rearward of the seat from the base 13 of member 7 to serve as the rear fork. Slots (or openings) are provided on the fork blades or dropouts are attached to the fork blades for securing rear wheel axle 18.

An additional frame element 19 is needed to provide a rigid mounting for the handlbar located directly under said seat. Thus element 19 may extend to the sides of said seat tube and connect with side member 11 and is of member 7, or depending on the particular embodiment and vehicle power source, may run generally lengthwise under said seat and be secured to one or more rigid frame members such as members 3 and a cross member between yoke members 16 and 17. In any event, the member 19 is curved downwardly to be at all times below the canvas seat.

For steering the vehicle, a handlebar 21 is provided having horizontal cross-member 22 and upwardly extending from each end of member 22, vertical members 23 and 24. The handlebar 21 is pivotally mounted by vertical shaft 26 rotatable in member 19 directly under this seat for generally horizontal rotation. The handlebar extends beyond the width of the seat and is angled upward, preferably higher than said seat. A pitman arm 27 is rigidly attached beneath the central portion of the handlebar 21, directly beneath said seat. The pitman arm 27 extends rearward of the handlebar. Pivotally attached to said pitman arm, rearward of said handlebar, are two tie rods 28 and 29 which extend widthwise and slightly forward being pivotally attached to said knuckle arms 4 and 5 at pivot points 25 rearward of where said knuckle arms are pivotally attached to said transverse member 3.

The locations of said pivotal attachment points on the pitmam arm and/or knuckle arms are critical in a vehicle of this nature, i.e., one whose steering front wheels are very far apart (wide track) in proportion to its wheelbase (approximately 1:1 ratio compared to 1:2 for a typical automobile). It is imperative that the front wheels do not remain parallel during a turn; the inside wheel must pivot more than the outside wheel so that the axes of the axles of all three wheels meet at a common point, the radius of the turn. The sharper the turn, the greater the difference in turning angles between the front wheels must be. The disclosed steering system allows the inside wheel to turn sharper than the outside wheel, as will be more fully explained.

The pivot placement of the handlebar is an important consideration in that it governs how many degrees of rotation the handlebar can pivot before being stopped by the frame member 7. The greater the distance of the pivot shaft 26 from the transverse member 3, the greater the maximum angle the handlebar can pivot. For maximum leverage and minimum steering, it is preferable for the handlebar to be able to turn through an angle of approximately 40 degrees in each direction, and for the handlebar to be angled such that the operator's elbows are slightly bent when steering straight ahead.

To insure proper steering geometry, allow for very sharp turns, and further reduce steering effort, the proper positioning of steering pivot points is essential. When the front wheels are straight ahead, it is desirable to position the tie rod/knuckle arm pivots rearward of and outside (closer to the wheels) of the knuckle arm/transverse tube pivots, such that the angle formed by each line extending between each of the knuckle arm/transverse tube pivots 6 and the knuckle arm/tie rod pivots 25 lies approximately at right angles to its respective tie rods 28 or 29. This arrangement allows steering to be easy, particularly when steering straight ahead because forces transmitted between the tie rods and knuckle arms are at 90° and are therefore minimized. Furthermore, locating the knuckle arm/tie rod pivots 25 close to the wheels allows the inside wheel to turn very sharply, since an extreme turn is needed to bring the knuckle arm pivots 6 close to being in line with its respective tie rod, the theoretical maximum turn this steering system can produce.

The ratio of (1) the distance from the handlebar pivot to the pivots between the tie rod and pitman to (2) the distance between the two pivot points on each knuckle arm roughly determines the steering ratio, i.e., the ratio the handlebar turns compared to the wheels. The ratio is inverse and thus if the first distance above is, for instance 6 inches and the second distance above is 12 inches, a 30° turn of the handlebar will produce approximately a 20° turn of the wheel. Specific ratios chosen are a function of the desired response of the system, i.e. sensitivity of steering.

Another consideration in steering is the fact that the inside wheel in a turn must turn at a sharper angle than the outside wheel so that the axes of all three wheels meet at a common point; the center of the radius of the turn. This feature is obtained by making the angle (the "first angle") between each tie rod and a line drawn between the handlebar pivot and associated pitman pivot greater than 90°. Thus, and reference is made to FIG. 1 of the accompanying drawings, if the handlebar is turned clockwise, the aforesaid angle relative to wheel 2 approaches 90° while the aforesaid angle relative to wheel 1 retreats from 90°. As a result wheel 2 is turned through a greater angle and by choosing the initial angles appropriately proper turning angles are achieved. Alternatively, the "first angle" may be 90° and the angle between a tie rod and a line drawn between the pivots of its associated knuckle arm may be greater than 90°. The former arrangement is perferrable for reasons already stated.

It is therefore shown that a vehicle of the disclosed design has improvements in frame design and steering which provide the following advantages. In summary:

(1) It has a minimum number of steering and frame components for a reduced likelihood of the development of "play" in the steering, and ease of manufacture.

(2) Weight is reduced because the two tie rods, being short, can be lighter per foot than if there were a long rod running the width of the vehicle. Furthermore, the pitman arm (which can be a small lightweight piece of metal plate) can be mounted directly to the handlebar; there is no need for a steering column.

(3) During hard acceleration, it may be desirable to pull rearward with one's arms, on the handlebar. In mounting and dismounting the vehicle, the handlebar may be used as a handrail in assisting the process. Vertically, one can place one's weight, causing no harm to any steering components.

(4) Very short turn circles can be achieved, because the tie rods cannot strike the wheels or tires and the geometry automatically accommodates large differences in turning angles between the front wheels.

(5) Applicant's steering system is precise and requires little effort by the operator because of the large mechanical advantage provided by the system; the distance from the handlebar pivot to the hand grips being quite large, relative to the pitman pivot distances. The steering motion is familiar, being basically the same as a bicycles. Furthermore, the placement of the entire steering arrangement under or to the side of the seat allows easy mounting and dismounting of the vehicle.

(6) The seat frame member 7 constitutes an anti-sway bar to restrain unwanted twist of the rear of the frame while turning.

Figure 4:
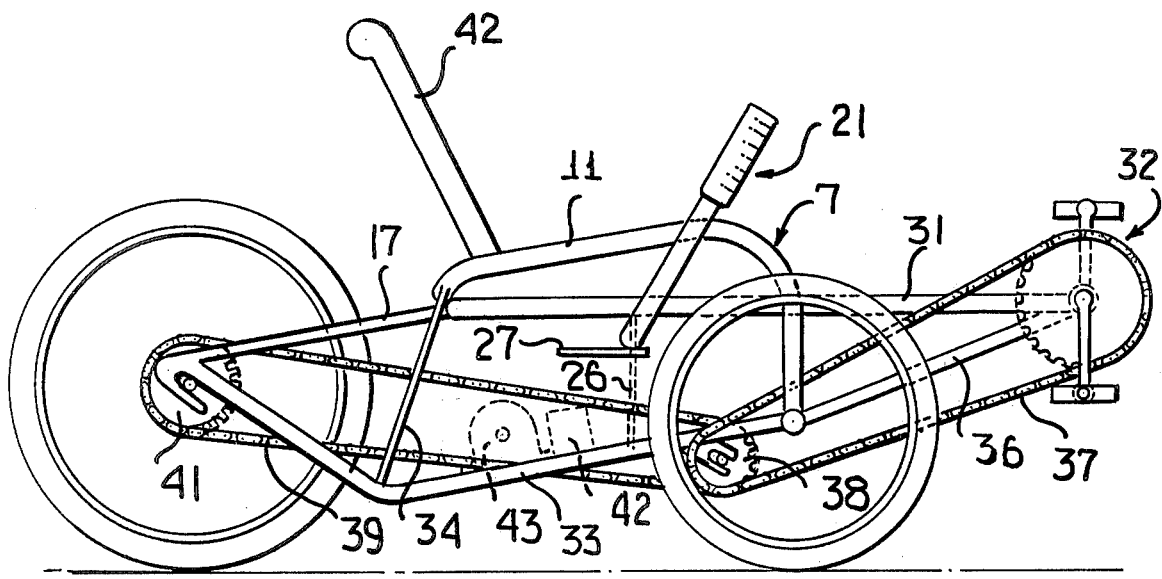
FIG. 4 is a side plan view of a pedal driven form of the apparatus.

The apparatus illustrated in FIGS. 1–3 is a coaster type vehicle capable of attaining very high speeds due to light weight and low profile. In accordance with a second embodiment of the present invention, several frame trusses may be added and/or the vehicle may be rear-wheel propelled by muscle power, as shown in FIG. 4 or motor driven also as illustrated in FIG. 4. Of importance is the addition of several frame members, including a longitudinal tubular member 31 extending through the central portion of the frame, under the seat and to a location forward of the transverse tube 3. This longitudinal tube 31 serves (1) as an attachment for the handlebar pivot, thus permitting elimination of member 19, and (2) as a support for a pedal crank assembly 32. A pair of trusses 33 whose ends are attached to the transverse member 3 inwardly of legs 8 and 9 of torsion bar 7. These trusses project rearwardly and slightly downwardly to a point roughly below the base 13 and then bend upward and connect to points on the members 16 and 17 near the rear axle, one on either side. Rigidly attached between the bend in the members 33 and a point on or near the edges of member 13 the torsion member 7 are two relatively small members or braces which combine to form a triangular section 34 between members 33; 16 and 17 and 34. Any upward force on the rear fork 16–17 by the rear wheel or otherwise is controlled by the trusses 34.

As can readily be seen in FIG. 4, the device may be provided with a foot powered sprocket drive, having a conventional pedal driven sprocket 32 mounted on the front end of members 31, which may be further strengthened by upwardly extending extensions 36 of member 33. A chain 37 driven by sprocket 32 drives a slave sprocket 38 which via chain 39 drives a sprocket 41 attached to the rear wheel.

Also of interest is a back rest 42 which attaches (either permanently pivotally, and/or detachable) to the seat tube behind the handlebar. The back rest allows for more pedalling ease by holding the operator more securely.

This vehicle is ideally suited for operation by electric power, as batteries 42 can be placed beneath the seat on trusses 33 which can be properly designed for such use, or may be strapped from above to the longitudinal tube rearward of the handlebar. The center of gravity of the vehicle can be lowered, due to the weight of the batteries, even if the seat is raised several inches. An electric motor 43 may be mounted in the place of sprocket 32 or preferrably on trusses 33 behind the battery for driving a shortened chain 39.

An important area of improvement for a vehicle of this type that has been largely overlooked is braking. A vehicle with a speed capability in excess of a 10-speed bike must be able to stop quickly and straight. The mechanisms must be lightweight and inexpensive.

For effective stopping, the front wheels must do most or all of the braking. This is because during braking, the weight transfer can put almost all the weight on the front wheels. The actual breaking mechanism may be conventional rim pads or other suitable apparatus.

The braking system must be designed to insure straight stops; independent braking of the front wheels, however, will cause swerving.

It is important that the brakes be hand-controlled and that either hand independently or both hands simultaneously can control the braking force.

Figure 5:
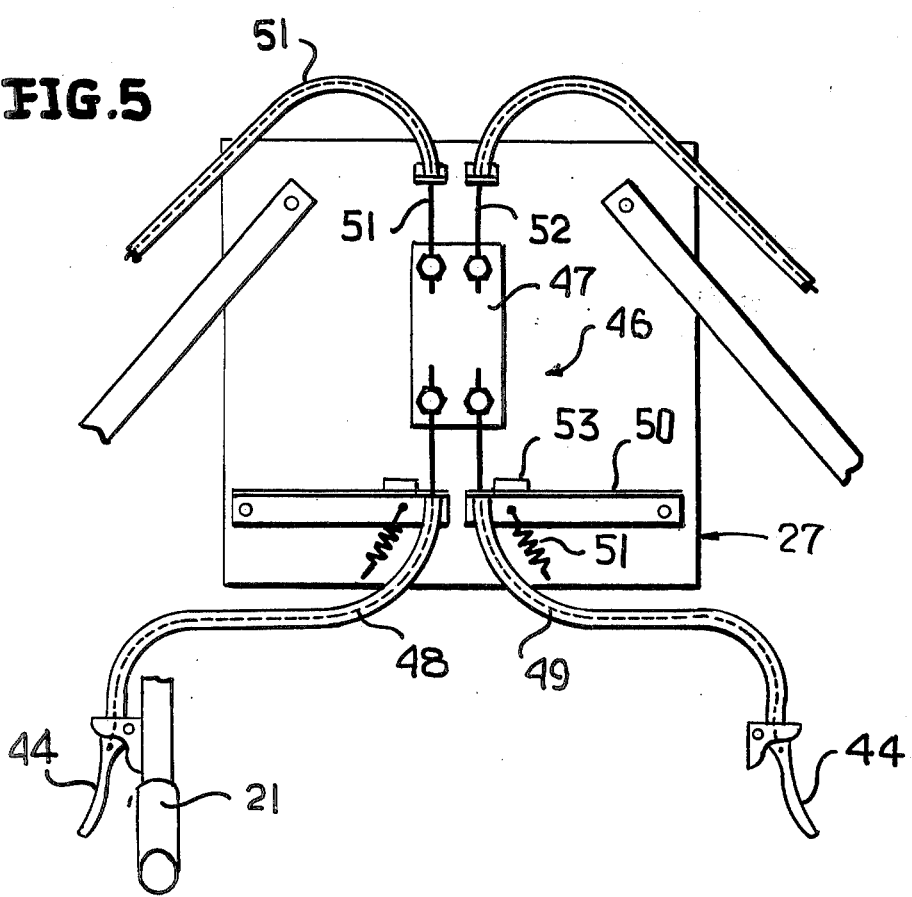
FIG. 5 is a top view of the brake system of the apparatus.

Referring now to FIG. 5, a bicycle brake lever 44 is mounted on both sides of the handlebar 21, within easy access of the handgrips. An equalizer mechanism 46 is mounted on the pitman arm 27, which includes an equalizer plate 47 that moves whenever a lever 44 is pulled such that it simultaneously and equally draws left and right brake cables 51 and 52 to activate their respective brakes not illustrated. In addition, left and right lever cables 48 and 49 are attached to the equalizer plate 47, and either lever can independently activate the brake cables. The cables 48 and 49 attached to plate 47 very close to one another so that very little skewing occurs. Two points of attachment are used as a safety feature so that failure of one coupling stud does not cause loss of the brakes.

Means are provided to take up slack in one level cable when only the other brake lever is pulled, as excessive slackness in a cable attached to an ordinary brake lever can unhook it from the lever inadvertently. This is done by means of a spring 51 which pulls arm 50 attached to lever cable housing 52 away from the equalizer plate. If the second lever is then pulled for more braking force, the lever cable housing first moves toward the plate 47, then hits a stop 53, then additional lever movement causes increased brake pressure. This improved cabling system can be used on any type of brakes that are actuated by cables.

One additional advantage to this brake cabling system is that it allows for cables to be directly routed, eliminating the likelihood of the brake cables dragging on the pavement while turning, because the cables can be extremely short. This is because, although the brakes move with respect to the frame during turns, the rear portion of the pitman arm, where the brake cables originate, moves in the same general direction. Therefore the brake cables, move sideways similarly to the tie rods when turning.

If front wheel braking is utilized the pivots 6 should be inclined so that their axes touch the roadway where the tires of the wheel touch thereby to prevent turning movements being developed.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A multi-wheeled vehicle comprising
   an elongated cross member,
   at least three wheels each rotatable about a stub shaft,
   means mounting a first and a second wheel, one at each end of said cross member for rotation in a plane perpendicular to the elongated axis of said cross member,
   means mounting a third of said wheels rearward of said cross member,
   a main frame member extending between said cross member and said mounting means,
   said main frame member comprising a U-shaped anti-sway bar lying in a plane and having a base and two legs having ends,
   said legs having end sections thereof curved at a relatively sharp angle to said plane and terminating at said ends of said legs,
   said ends being rigidly secured to said cross member equidistant between said first and second wheels with said plane being generally horizontal.

2. A multi-wheeled vehicle according to claim 1 wherein means mounting a third of said wheels comprises yoke means secured to said base of said anti-sway bar.

3. A multi-wheeled vehicle according to claim 2 further comprising a further frame member extending secured to and extending forward from the base of said U-shaped anti-sway bar to a point forward of said cross member,
   a still further frame member extending between said cross member and said further frame member, and
   pedal means mounted on said further frame member forward of said cross member for driving said third wheel.

4. A multi-wheeled vehicle according to claim 2 further comprising a seat secured to said anti-sway bar generally in said plane.

5. A multi-wheeled vehicle according to claim 3 further comprising a steering mechanism having a pair of hand grips located at opposite sides of said seat, respectively,
   a pair of brakes each operatively associated with a different one of said front wheels,
   a pair of hand actuated brake operating levers each associated with a different one of said hand grips, and
   means for operating said brakes associated with each of said front wheels upon operation of either one of said levers.

6. A multi-wheeled vehicle according to claim 5 wherein said means comprises a rigid member,
   a first pair of Belsen wires each having its cable extending from one of said levers to said plate,
   a second pair of Belsen wires each having its cable extending from said plate to a different one of said brakes, and
   means for taking up slack in the shield of one of said first pair of Belsen wires when the other of said Belsen sires of said first pair is activated.

7. A multi-wheeled vehicle according to claim 1 wherein said means for mounting first and second wheels comprises pivot means for mounting said wheels for rotation about a generally vertical axis located between said wheels,
   means for steering said wheels comprising a rotatable shaft located below said anti-sway bar and rearward of said end sections thereof,
   a plate secured to said shaft, for rotation therewith,
   a separate arm secured to each said wheel for rotation thereof and extending rearward therefrom,
   a first rod pivoted in each of and extending between said plate and a first of said arms,
   a second rod pivoted in each of and extending between said plate and a second of said arms,
   a first set of angles each defined by a first side extending between said rotatable shaft and one of said pivots of said rods to said plate and a second side defined by one of said rods,
   a second set of angles each defined by one of said rods and a line drawn between each of said pivot means and its associated pivot of one of said rods in said arms,
   one of said sets of angles being greater than 90°.

8. A multi-wheeled vehicle according to claim 7 further comprising a U-shaped handlebar having legs and a base secured to said shaft and extending under said horizontal part of said anti-sway bar to points located outwardly of said legs of said anti-sway bar, said legs of said handlebar extending upwardly to a point above said legs of said anti-sway bar.

9. A multi-wheeled vehicle according to claim 8 having a seat secured to said legs of said anti-sway bar above said shaft.

10. A three-wheeled vehicle including a rigid metal frame having a seat, a rear wheel rotatably connected with the rear end of said frame, a pair of laterally spaced front wheels each having a stub shaft, steering means including a pair of knuckle arms connected to said stub axles of said front wheels, a pair of generally vertical kingpins pivotally connecting said knuckle arms with a forward portion of said frame for pivotal movement about generally vertical pivot axes, respectively, said knuckle arms being generally horizontal and extending rearwardly of said vehicle from said frame, respectively, a horizontal pitman arm located directly beneath said seat, a pair of tie rods pivotally connected at one end with said knuckle arms rearwardly of said kingpins, respectively, the other ends of said tie rods being pivotally connected with said pitman arm, said pitman arm and said knuckle arms being so arranged relative to said frame that said tie rods extend from said pitman arm forwardly and generally obliquely outwardly relative to the longitudinal axis of said vehicle, handle bar means including a horizontal central portion extending transversely of said frame directly beneath said seat, said central portion having a centrally located vertical pivot, said central portion extending at each end beyond said seat, said pitman arm being rigidly connected to said central portion intermediate its ends, and a pair of handle portions connected with the ends of said central portion, respectively, said handle portions extending upwardly from said central portion on opposite sides of said seat.

* * * * *